Nov. 13, 1928.
H. SCHLAICH
1,691,134
SMALL BORE TUBING AND METHOD AND APPARATUS FOR THE MAKING OF SAME
Filed April 10, 1918
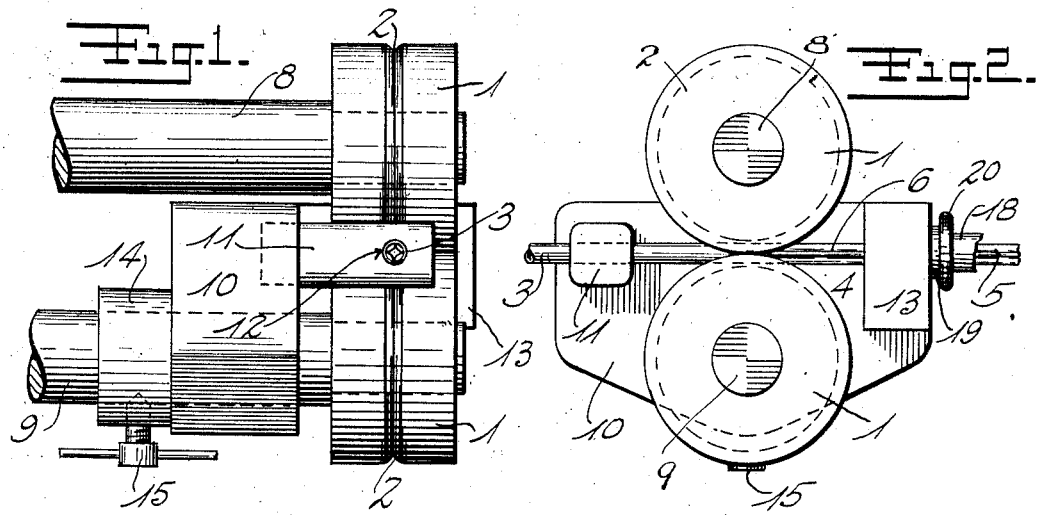
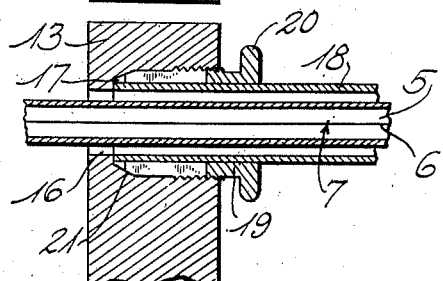
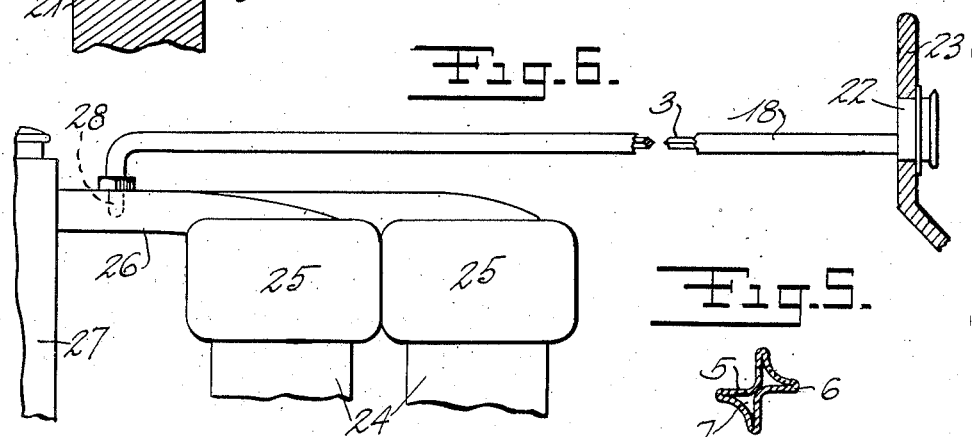
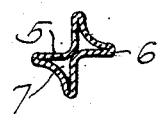
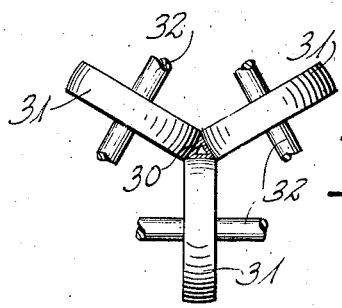
INVENTOR
Herman Schlaich
BY
Edmund ... ATTORNEY Patented Nov. 13, 1928.

1,691,134

UNITED STATES PATENT OFFICE.

HERMAN SCHLAICH, OF BROOKLYN, NEW YORK.

SMALL-BORE TUBING, AND METHOD AND APPARATUS FOR THE MAKING OF SAME.

Application filed April 10, 1918. Serial No. 227,754.

This invention relates to the manufacture of small bore tubing and more especially to a shape or construction of tubing of substantially capillary bore adapted for use in thermometers of the distance type or for other similar purposes where a fluid filled transmission tube may be employed. The invention comprises also a novel method of an apparatus for manufacturing such tubing. Another feature of the invention relates to the construction of tubing of the character set forth provided with a casing.

The objects of the invention include the production of a novel form of tubing so shaped as to have a bore smaller than that of the smallest tubing which is now commercially manufactured by the usual tube producing methods; the producing of tubing of this character rapidly and cheaply, and the encasement of such tubing in a protective and heat insulating sleeve in a simple and economical manner. Another object of the invention is the provision of a tube of such shape that it is not easily crushed or flattened out so as to entirely close the opening thereof. The nature and specific objects of the invention will be clear from the following description of one embodiment of the invention illustrative of the principle thereof.

In the accompanying drawings which form a part of this specification, Figure 1 is a side elevation of an apparatus which may be employed in the production of the novel form of tubing. Figure 2 is a front elevation of the apparatus shown in Figure 1. Figure 3 is a detail sectional view showing a clamp for holding the encasing sleeve and showing how the reshaped tubing can be forced into this sleeve or casing. Figure 4 is a cross section on enlarged scale showing the reshaped tubing enclosed within the sleeve or casing. Figure 5 is a diagrammatic cross sectional view of the reshaped tubing showing how it may be deformed without entirely closing the opening therethrough. Figure 6 is a diagrammatic view illustrating the novel tubing as employed in a temperature indicating instrument for the internal combustion engine of an automobile, aeroplane or the like. Figure 7 is a diagrammatic view illustrating a modified form of the tubing and of rolls for producing the same.

My invention is concerned mainly with tubing of very small bore such as is employed in the example of the application of the invention illustrated in Figure 6, where the tubing constitutes the connecting or transmitting element between the temperature responsive device or bulb 28 of a distance type thermometer and the indicating device or instrument 22 thereof. Changes in the temperature of the bulb cause the expansion or contraction of the body of fluid therein which, acting through the column of fluid in the tube 3, causes an increase or decrease of the pressure in the Bourdon spring or other pressure responsive element in the gage 22 so that the latter will give an indication of temperature changes at the bulb. In the particular example illustrated the bulb 28 is shown as located in the return pipe 26 of the cooling system of an internal combustion engine as set forth in the patent to Boyce No. 1,206,783. The cooling water circulates through the jacket 25 around the cylinders 24 and through the return pipe 26 to the usual radiator 27. The bulb 28 is thus so located as to be influenced by the cooling water after it has reached its highest temperature. The instrument 22 is located at some distance from the bulb 28 and in a convient position for observation by the operator, usually upon the dash board 23. It is the object of an instrument of this character to give an accurate indication of temperature changes at the bulb or temperature responsive element but a source of error exists in the column of fluid contained within the tube 3. This tube is usually of considerable length and is subjected to temperature conditions which may vary greatly and which are usually quite different from the temperatures to which the bulb 28 is subjected. The column of fluid in the tube will therefore expand or contract in accordance with the variation in these external conditions and wholly independently of the temperature of the bulb. If the volume of fluid in the tube 3 is sufficiently small as compared with the volume of fluid in the bulb, the error produced by the expansion or contraction of the fluid in the tube will be so small as to be negligible but if the volume of fluid in the tube is considerable the error from this source may be so great as to render the instrument virtually useless. The importance of reducing the capacity of the tube is therefore at once apparent and the present invention is directed primarily towards effecting such reduction. The errors due to expansion or contraction of the fluid in the tube may also be reduced by reducing the temperature variations of the tube and the invention therefore also preferably provides for the encasing of the tube in a temperature insulating shell or sleeve which acts as a mechanical protection as well for the tube.

While it has been known that it was very desirable to utilize in temperature indicating instruments of the character referred to, a tube having a small bore, it has not been practical by ordinary commercial processes to produce such tubing having an internal diameter of less than approximately fifteen thousandths of an inch. The employment of tubing having a bore of this or larger diameter introduces great errors into an instrument, and it has therefore been attempted to reduce the volume of the tubing by introducing a wire into the same, partly filling up the bore. The use of such a filling wire is, however, not satisfactory as it must either be so much smaller than the internal diameter of the tube as not to accomplish the desired purposes or if it is attempted to utilize a wire of sufficient diameter to almost fill the bore it so difficult of insertion into the tubing, as to be commercially impracticable. I accomplish the desired result of reducing the volume of the tubing without the introduction of any filler thereinto but merely by reshaping the tubing so as to greatly diminish the cross section of the bore thereof. In accordance with my invention I am able to produce reshaped tubing having a volume much less than that of the smallest commercial drawn tubing and much less even than the volume of such tubing when provided with a filling wire. I am also able to produce such reshaped tubing in any length and in an exceedingly rapid and economical manner.

In practicing my invention any suitable instrumentalities may be employed but preferably I make use of mechanism comprising a pair of rolls 1 mounted so that their faces rotate in contact with each other; and in each roll I provide a groove 2. These grooves are approximately V-shaped but have their sides slightly convex; that is to say, these grooves will be in cross section somewhat like a V if the arms of this V are curved away from each other toward their outer ends. The grooves may be described as, " cusp-shaped." When the rolls are in operative position the groove of one will register with the groove of the other, as indicated in Figure 1; and the space enclosed by these grooves at the point where the rolls touch each other will have the form of a four-sided figure with its sides concave, as Figure 1 illustrates. I do not, however, wish to be limited to any particular cross sectional shape in connection with the grooves 2, as I may wish to vary the configuration of these grooves under different conditions.

In operation, a piece of tubing, such for instance as ordinary small bore drawn copper tubing which is round on the outside, and has a round bore therethrough, is passed between these rolls, and is reshaped by them. Such a piece of tubing is indicated at 3 in Figure 2. When it passes between the rolls 1 and through the grooves 2, these rolls compress, bend or squeeze the material forming the tubing towards the center or longitudinal axis of the same; this compressing taking place as the tubing passes through the rolls along successive portions of length of the tubing; and preferably around the entire circumference. In consequence the tubing is reshaped, in cross section, as shown at the right of Figure 2, also in Figures 3 and 4. In the operation of reshaping, certain portions of the tubing are squeezed inward and made concave, as indicated at 5 in Figure 4, and these concave or reentrant portions will be separated from one another by longitudinally extending rib-like projections 6. Both the portions 5 and the projections 6 will run along the tubing from one end to the other, making the tubing corrugated in effect when the operation of the reshaping is completed. Furthermore, the bore 7 through the tubing, instead of continuing to be round, will be in cross section somewhat like the form which Figures 1 and 4 present; and the cross-sectional area of this bore will be considerably less than the cross-sectional area of the bore before the tubing is worked in the manner described. I find it possible to take a piece of tubing of very small size, and by passing it between the rolls 1, to reduce the area of the bore to a small fraction of its original area, and thus greatly diminish the quantity of the fluid which is necessary to fill the tubing.

The mechanism shown in Figures 1 and 2 comprises a shaft 8 on which the upper roll 1 is fixed, together with a support such as a journal 9 on which the lower roll 1 may be mounted to turn idly. If the shaft 8 is rotated, the mechanism will operate properly, and the tubing 3 will be drawn forward and engaged by the sides of the grooves 2 in the manner necessary to secure the desired end. Rolling machines are well known, and by providing rolls properly grooved I may employ any convenient machine of that type for my purpose. Obviously, either or both of the rolls may be positively driven. But I prefer the illustrated arrangement in which the part 9 is fixed; so that I may mount thereon a suitable member 10 which carries at one side of the rolls a guide 11 having an opening 12 in line with the grooves 2. On the opposite side of these rolls is a support 13 which secures the end of a piece of tubing 18 of greater bore than the outside diameter of the tubing 3; so that the tubing 3, after being reshaped and delivered by the rolls 1, can be fed into the tubing 18 for any required distance; thus providing the tubing 3, after reshaping, with a sleeve or casing. The member 10 may have a sleeve or boss 14 to encircle the part 9, and a binding screw 15 may pass through the sleeve 14 and be adjustable so that this sleeve may be secured in proper position on the part 9 with reference to the rolls 1.

As shown in Figure 3, the support 13 will have an aperture 16 which is enlarged to provide a shoulder 17. The piece of tubing which is to make the sleeve or jacket for the tubing 3 is inserted into the opening in the support until its end abuts against the shoulder 17. Around the tubing 18 adjacent this end is a nut 19 having a milled rim 20 to enable it to be manipulated. This nut has screw threaded engagement with the support 13, and its end is tapered or conical to engage a conical walled section 21 of the aperture through the support beyond the shoulder 17 in the direction of travel of the tubing 3. I slot this nut in several places around the circumference thereof, from the conical end towards the milled rim 20. Hence, when the nut 19 is screwed into the support as far as it will go, the conical wall 21 will compress the inner end of the nut; thereby causing it to clamp the end of the tubing 18, and thus hold the tubing 18 in place.

By this arrangement of parts I not only am enabled to reshape a piece of tubing having a bore of capillary dimensions; but also, in the same operation, to insert it into the sleeve 18, even though a considerable length of tubing is required to be reshaped and enclosed in a sleeve in this way. The tubing 3 goes into the tubing 18 easily, even though one or both pieces of tubing may be curved or bent; but the liability of any bends occurring in the tubing 3 of course is greatly lessened by the fact that the operation of the rolls 1, beside reshaping the tubing 3 also tends to smooth the same out and eliminate bends. Furthermore, by reshaping the tubing 3 in such a way as to provide the rib-like projections 6, the tubing 3 is reinforced longitudinally and becomes stiffer and more rigid and thus can be pushed into the sleeve 18 so much more readily and with less liability of being obstructed.

By the process set forth above I am not only enabled to reduce the cross-sectional area 7 of the whole of the tubing 3, and thus reduce the amount of liquid required to fill it, but I am also enabled to enclose the tubing in a sleeve 18 to much better advantage as regards the thermal insulation of the tubing.

This follows because the star shaped tubing 3 will contact with the inner surface of the sleeve only along one or more of the ribs or ridges 6, thus yielding substantially line contact with the minimum area for heat transference. Furthermore the ridges support the body of the tube substantially in the middle of the sleeve or casing thus providing considerable air spaces upon all sides of the tube.

Figure 5 shows the capacity of my novel form of tubing for considerable distortion or crushing without completely closing the opening therethrough. The tubing may be crushed to such an extent that two of the reentrant sides are brought into contact while still leaving a sufficient opening to permit the fluid to move through the tube.

In Figure 7 I have shown a modified form of the tubing which is depressed from three directions so as to produce a tube of substantially triangular configuration as shown at 30. This form may be produced by the use of three rolls 31 mounted on axes 32 arranged at angles of 60° to one another. Other possible formations of the tubing will readily suggest themselves.

While I have described and illustrated in detail certain preferred forms of my invention and a method and apparatus by which my novel tubing may be produced it is to be understood that the invention is capable of a wide range of modification, that variations may be made in the shape of the tubing, and that the tubing may be produced by any suitable method and with the use of apparatus other than that described. I do not therefore desire to be limited in the application of my invention but intend to cover the same in whatever mode its principle is employed.

Capillary tubing, reshaped in the above described manner, can be made with bore so small that lengths of 30 feet and more will have a capacity of only one tenth of that of the bulb 28, with which the tubing connects.

As illustrated in Figure 7, the rolls 31 have curved or convexed faces but obviously the faces of these rolls may be flat if desired. I may also use an arrangement of more than 3 rollers with flat or convex faces to work a piece of tubing in order to reshape it and reduce the capacity of the bore, as will be readily understood.

I may also under some conditions give the groove 2 in the rolls 1 the cross-sectional shape of a semi-circle. With such a construction the capillary tubing will remain tubular after being worked by being passed between the rolls 1, through the grooves 2. In this case it will simply be compressed and the capacity of the bore reduced without the cross-sectional shape under-going any alteration.

The term "capillary tubing" as used in the present specification and claims is intended to define tubing of the smallest capacities, in which the bore is of hair-like dimensions. Moreover, in the distance type instrument art in which the present invention finds its special field of applicability, the term "capillary" or "capillary tube" has an accepted meaning as designating the pressure transmitting tubing, connecting the bulb of the instrument with the instrument head or indicating part proper which latter usually consists of a Bourdon spring which is so shaped as to change its form in response to changes in internal pressure and which therefore is necessarily of much greater than capillary dimensions as that term is herein employed.

Having described my invention what I believe to be new and desire to secure and protect, is:

1. Corrugated capillary tubing.

2. Capillary metallic tubing for thermometers and the like having its wall formed of three or more longitudinally extending inwardly curved sections united at their adjoining edges.

3. As an article of manufacture, tubing having corrugations in its wall to provide longitudinally extending, rib-like, projections on its exterior, and means for thermally insulating said tubing, said means comprising a sleeve enclosing said tubing.

4. As an article of manufacture, tubing having longitudinal reentrant portions separated from one another by longitudinally extending rib-like projections, and means for insulating said tubing against external variations of temperature, said means comprising a sleeve enclosing said tubing, the tubing making contact with the sleeve along said rib-like projections only.

5. The method of reducing the volume of capillary tubing which consists in depressing a longitudinal groove therein.

6. The method of reducing the volume of capillary tubing which consists in deforming the tubing by forces applied to the tubing from more than two directions transverse to the axis of the tubing.

7. The method of deforming capillary tubing which consists in rolling three or more longitudinal depressions in the tubing, so as to reduce the volume contained within the tubing.

8. The method of producing small bore encased tubing which consists in holding the casing stationary and feeding finished tubing between rolls which deform it in such a way as to reduce its volumetric content and force it into said casing.

9. The method of producing small bore encased tubing which consists in supporting an end of the casing in fixed position adjacent to a set of rolls and feeding finished tubing between said rolls and from the latter into said casing, said rolls compressing the tubing to reduce its volumetric content and forcing the same into said casing.

10. The method of working tubing which consists in reshaping a piece of tubing by compressing the tubing about its circumference along successive portions of the length of the tubing, to provide rib-like projections with reentrant portions between the projections, and then feeding said tubing into a sleeve or casing.

11. The combination of a pair of rolls having grooves for reshaping a piece of tubing, a guide at one side of the rolls, a support on the other side of the rolls, and means comprising a slotted nut and a member having a conical bearing surface for said nut for securing to the support the end of a larger piece of tubing to receive the first tubing after the rolls deliver the same.

12. Capillary tubing deformed to reduce the volumetric capacity of the bore thereof.

13. The method of insulating tubing against external temperature changes, which consists in deforming the same so as to provide longitudinal rib-like projections thereon and enclosing the tubing by a sleeve such that the same can make contact only with said projections.

14. The method of rendering tubing suitable for transmission of variations of the volume and pressure of a fluid, which consists in deforming the tubing to reduce the capacity of its bore, and enclosing the tubing in a sleeve to thermally insulate the same.

15. The method of rendering tubing suitable for accurate transmission of variations of volumes and pressures of fluids, which consists in corrugating the tubing to reduce the volumetric capacity of its bore and enclosing it in a sleeve arranged to contact only with the outer edges of the said corrugations in order to minimize the effect of external temperature variations on the fluid in the tube.

16. Tubing for use in temperature or pressure measuring instruments, for causing a fluid within the tubing to transmit accurately to one end of the tubing movement impressed on the fluid at the other end of the tubing, the bore of said tubing being of capillary dimensions and the wall thereof being provided with at least three longitudinal re-entrant portions spaced about the circumference, whereby the said tubing is caused to have a cross sectional area considerably below that of the tubing in its original state.

In testimony whereof, I have signed my name to this specification this 16th day of March, 1918.

HERMAN SCHLAICH.